(12) United States Patent
Cockbain

(10) Patent No.: US 6,779,960 B1
(45) Date of Patent: Aug. 24, 2004

(54) VEHICLE LIFT APPARATUS

(75) Inventor: Neil Hewitt Cockbain, Glossop (GB)

(73) Assignee: Peak Mobility And Handling Limited, Glossop Derbyshire (GB)

( * ) Notice: Subject to any disclaimer, the term of this patent is extended or adjusted under 35 U.S.C. 154(b) by 0 days.

(21) Appl. No.: 09/403,644

(22) PCT Filed: Apr. 22, 1998

(86) PCT No.: PCT/GB98/01162
§ 371 (c)(1),
(2), (4) Date: Oct. 22, 1999

(87) PCT Pub. No.: WO98/47458
PCT Pub. Date: Oct. 29, 1998

(30) Foreign Application Priority Data

Jun. 16, 1998 (GB) .......................... 98/01162

(51) Int. Cl.⁷ ................................. B65F 3/00
(52) U.S. Cl. ...................... 414/544; 414/539; 414/541; 414/921; 187/200
(58) Field of Search ................ 414/921, 539, 414/541, 544; 187/200

(56) References Cited

U.S. PATENT DOCUMENTS

| | | | | |
|---|---|---|---|---|
| 3,174,634 A | * | 3/1965 | Peck ........................ | 414/451 |
| 4,479,753 A | * | 10/1984 | Thorley .................. | 414/921 X |
| 4,583,466 A | * | 4/1986 | Reddy et al. ........... | 414/921 X |
| 4,778,328 A | * | 10/1988 | Apgar .................... | 414/921 X |
| 4,958,979 A | * | 9/1990 | Svensson ............... | 414/921 X |
| 4,991,890 A | | 2/1991 | Paulson | |
| 5,149,246 A | * | 9/1992 | Dorn ...................... | 414/921 X |
| 5,158,419 A | * | 10/1992 | Kempf et al. .......... | 414/921 X |
| 5,180,275 A | * | 1/1993 | Czech et al. ............ | 414/921 X |
| 5,375,962 A | * | 12/1994 | Kempf ................... | 414/921 X |
| 5,542,811 A | * | 8/1996 | Vartanian ................ | 414/451 |
| 5,674,043 A | | 10/1997 | Dorn | |
| 5,678,883 A | * | 10/1997 | Bittner et al. ........... | 414/921 X |

FOREIGN PATENT DOCUMENTS

| | | | | |
|---|---|---|---|---|
| DE | 004135911 | * | 5/1993 | ............. 414/921 X |
| EP | 0359600 | | 11/1989 | |
| GB | 2224992 | | 5/1990 | |
| GB | 2106857 | | 3/1992 | |
| JP | 5-221259 | * | 8/1993 | ................. 414/451 |
| JP | 405221259 | * | 8/1993 | ............. 414/921 X |
| WO | WO 95/18725 | * | 7/1995 | |

* cited by examiner

Primary Examiner—Steven B. McAllister
(74) Attorney, Agent, or Firm—Baker Botts LLP

(57) ABSTRACT

A lifting device for a vehicle comprises a rail chassis which can be fitted transversely across the vehicle in a luggage compartment underneath a load deck of a vehicle, and a carriage assembly which extends outwardly of the vehicle, along the chassis, the carriage assembly comprising an inner frame and an outer frame which operate telescopically in a vertical direction, to carry a load platform between a raised and lowered position, in which at lower position the load platform is at ground level, and in which at raised position, the load platform is at a same level as a passenger deck of the vehicle. The lifting device saves space, due to its vertical installation in a luggage compartment underneath a passenger deck, and is easily installed by fitment directly to the floor of the luggage compartment of the vehicle.

2 Claims, 16 Drawing Sheets

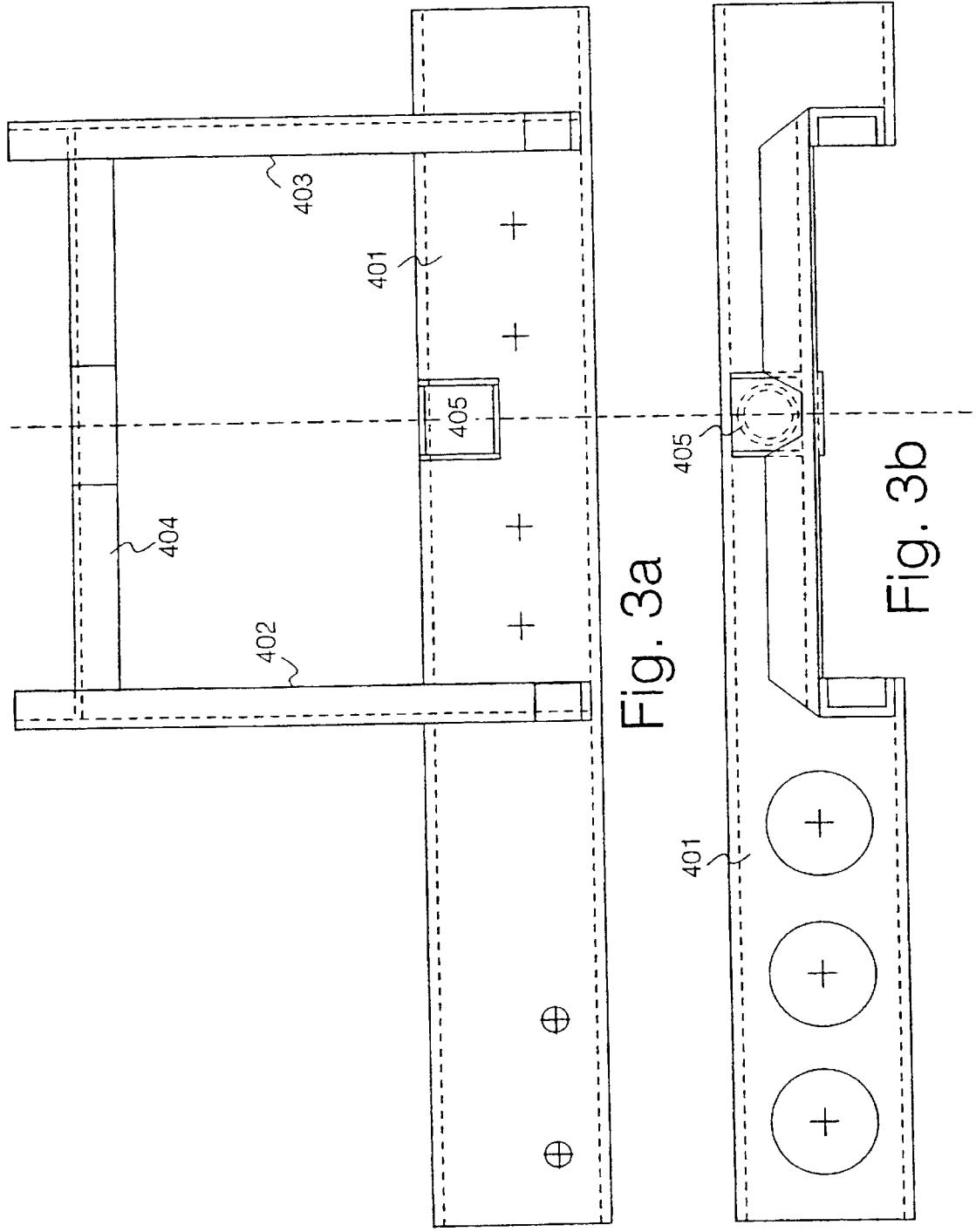

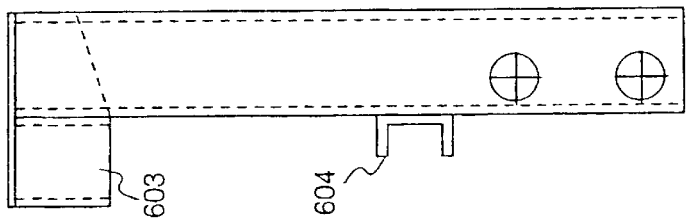
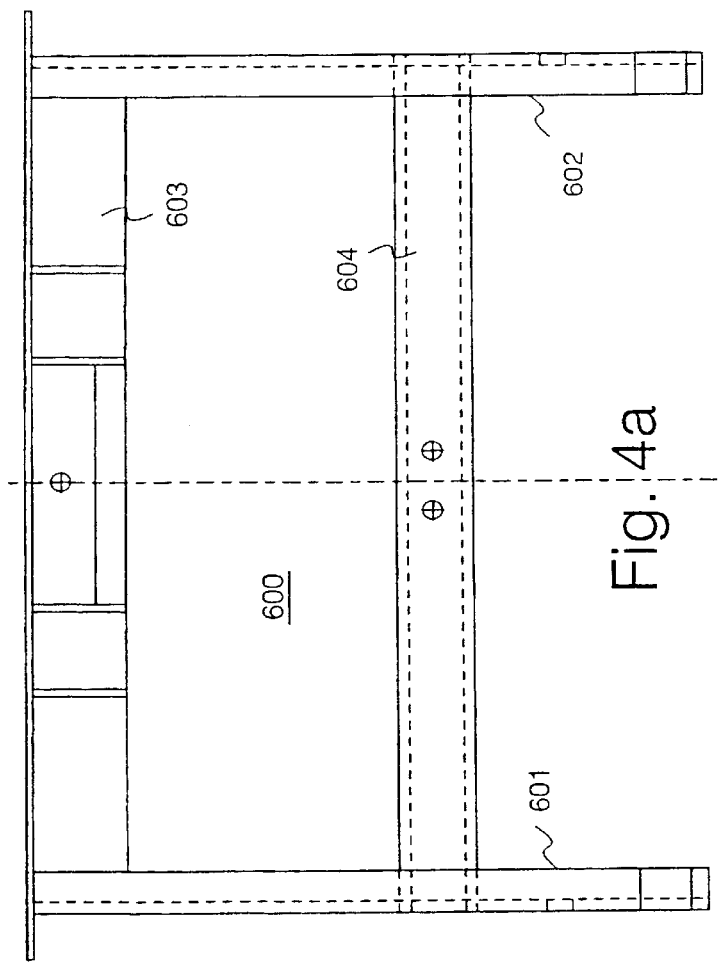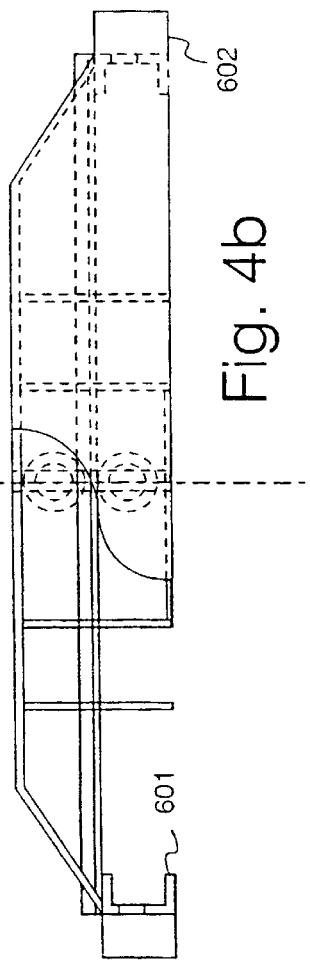

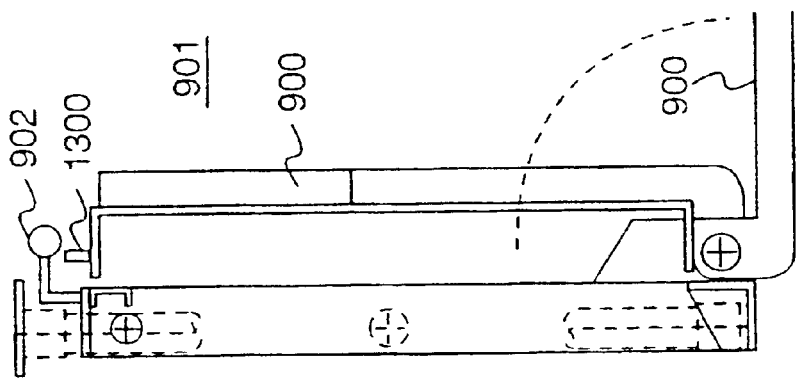
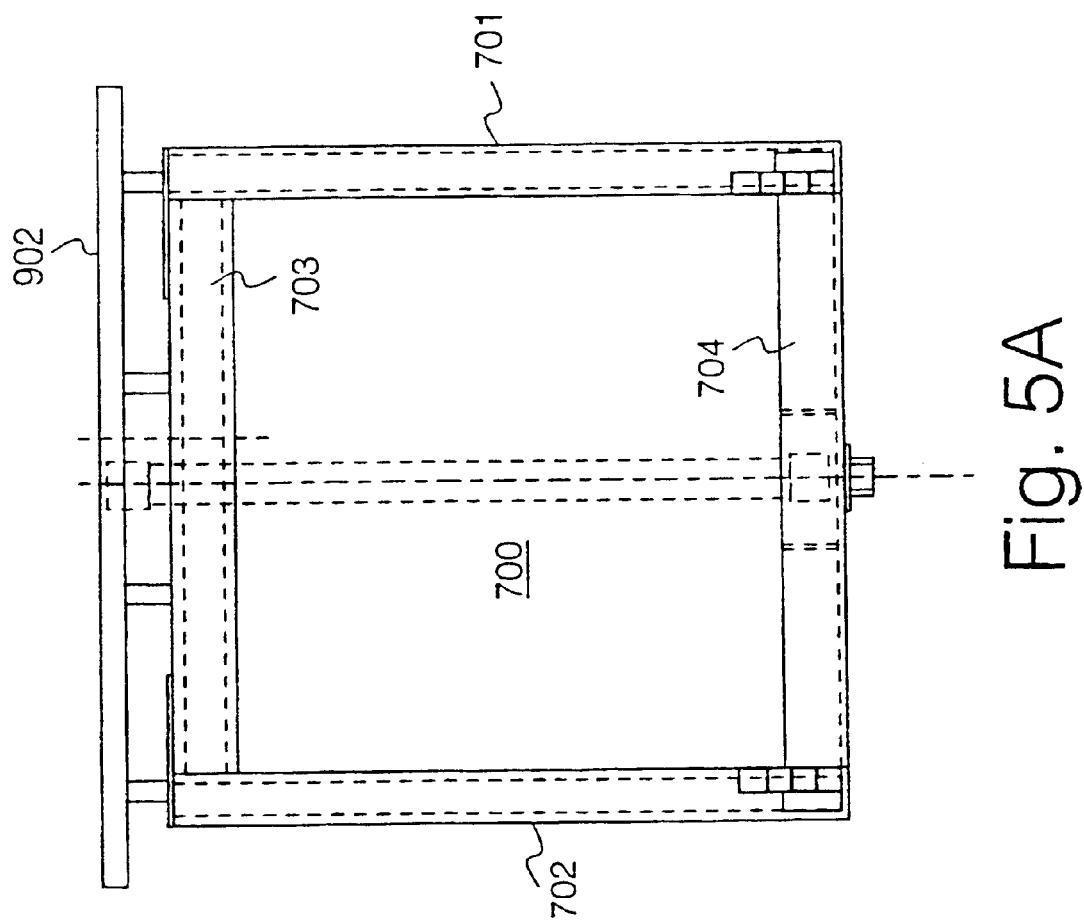
Fig. 5B
Fig. 5A

VEHICLE LIFT APPARATUS

FIELD OF THE INVENTION

The present invention relates to the field of vehicle lifts, such as those used to load items, particularly although not exclusively passengers, into vehicles such as "hi-line" coaches, buses or railway coaches.

BACKGROUND TO THE INVENTION

Conventional coaches and buses of the "hi-line" type, comprise a passenger deck which is positioned above the wheels of the bus usually at a height from the ground of up to 1.7 meters. Similarly, a conventional railway carriage has a load deck positioned over a set of bogies which carry a set of wheels. In each case, there is a significant distance between the load deck and the level of the ground. The conventional "hi-line" road coach, comprises an access door for access to the passenger deck, and a plurality of luggage compartments for storing luggage underneath the passenger deck. For enabling access of disabled persons into and out of the access door, it is known to provide an hydraulic lifting device which is situated in a luggage compartment directly underneath the access door. The prior art lifting device comprises a platform which can be raised and lowered between the level of the passenger deck and the ground, operable by a remotely located hydraulic power supply which produces hydraulic power from electrical power supplied from an electrical system of the coach, and a cassette type subframe which is mounted to the coach body, and into which the platform retracts when not in use.

The known lifting device is installed in a luggage compartment 200 underneath the passenger deck of a "hi-line" type coach or bus. The platform is carried by a pair of arms, one positioned at each side of the platform, one end of each arm attached to the platform, and another end of each arm attached to the sub-frame fitted in the luggage compartment of the coach at a position approximately midway between the passenger deck and a floor of the luggage compartment. In use, the platform is raised between a pavement, or road surface, and the passenger deck, so that persons in wheelchairs may mount the platform from the road or kerb, and the platform is then raised up to the level of the passenger deck, whereafter the wheelchair users may roll the wheelchairs directly onto the passenger deck of the coach. The arms travel in an arc of movement between the level of the road or pavement and the level of the passenger deck, the arc of movement centered around a level approximately midway up the luggage compartment, and between the level of the passenger deck and the level of the road/pavement. However, the conventional lifting apparatus has a number of drawbacks:

Firstly, because one end of each of the arms needs to be at a height between the passenger deck and the road/pavement, the sub-frame needs to be fitted more or less centrally across the luggage compartment, at a height in the luggage compartment between the floor of the luggage compartment and the passenger deck. The lifting apparatus effectively occupies the whole of the luggage compartment, extending across the whole length of the luggage compartment and across the width of the coach/bus. The whole luggage space of the compartment is effectively lost by fitment of the lifting device.

Secondly, because the sub-frame cassette is mounted more or less centrally in the luggage compartment, suspended in mid air between the passenger deck and the floor of the luggage compartment, fitting of the sub-frame cassette is time consuming and difficult, since special brackets need to be provided for suspending the sub-frame cassette below the passenger deck at the appropriate height. Installation of the known lifting apparatus can take of the order of one or two days, leading to increased cost, and loss of the vehicle from operational service for a significant period of time.

In GB 2224992, there is disclosed another type of vehicle lift for lifting and unlifting a load into a vehicle body. The lifting device is positioned underneath the vehicle body and extends out from underneath the vehicle body to a rear of the vehicle. A pair of extending arms support a platform which is raised or lowered between the level of the ground and a load platform of the vehicle body. In this case, the vehicle lift, in a stowed position, is carried underneath the vehicle at a level at or below a level of an axle of the vehicle's wheels. The platform is stowed such a main of a platform is substantially horizontal, but tilted with respect to the ground, and is parallel to a main plane of a part of the vehicle underside. The lifting device disclosed in GB 2224992 is unsuitable for use as a lifting device for a "hi-line" type coach having a load deck placed at a height above an upper extremity of the wheels, and the load deck extending over the top of the wheels, because the "hi-line" coaches do not have doors at the back of the vehicle, and the lift height is too great for the device of GB 2224992.

SUMMARY OF THE INVENTION

Specific embodiments according to the present invention aim to provide a compact lifting apparatus which is suitable for "hi-line" type coaches and railway coaches, and which is space saving compared to prior art devices, and requires less installation time.

According to a first aspect of the present invention, there is provided a vehicle fitted lifting device fitted into a luggage compartment having a door and fitted substantially underneath a cabin access door, said device being configured for lifting a load into and out of a vehicle comprising a load deck, the lifting device comprising:

a platform operable to raise or lower between said load deck and a level beneath said load deck;

means for raising and lowering said load platform;

means for securing said load platform to said vehicle;

characterised in that said load platform is arranged to stow beneath said load deck such that a main plane of said load platform is positioned transversely to a main plane of said load deck and a main plane of said load platform is positioned transversely to a main length of said vehicle.

Preferably said load platform is stowed in an upright position.

Preferably said upright position is substantially vertical.

Preferably said load platform is moveable from a position underneath said load deck to a position outside said load deck whilst remaining in an upright position.

Preferably said means for securing said load platform to said vehicle comprises a carriage adapted for containing said load platform in an upright position underneath said load deck.

Preferably said means for securing said load platform to said vehicle comprises a chassis frame having first and second rail members spaced apart from each other and arranged such that in a stowed position, said load platform is positioned between said first and second rails.

Preferably said means for raising and lowering said load platform comprises first and second hydraulic rams.

According to a second aspect of the present invention, there is provided a vehicle fitted lifting device fitted into a luggage compartment fitted substantially underneath a cabin access door, said device being configured for lifting a load into and out of a vehicle load deck, said lifting device comprising:

An elongated chassis comprising first and second rails, said chassis mounted in the vehicle;

a carriage moveable along said chassis from a position underneath said load deck to a position outside said load deck; and a load platform;

characterised in that said load platform is moveable between an upright stowed position, in which a main plane of said load platform is positioned transversely to a main plane of said load deck and transversely to a main length of said vehicle, and an operating position in which said load platform operates to raise and lower said load.

Preferably said load platform is carried on a frame assembly, said frame assembly operating in use to raise or lower said load platform above and below a level of said carriage.

Preferably said chassis is adapted for mounting directly to a floor of a luggage compartment of said vehicle.

Preferably said lifting device comprises hydraulic ram means for raising and lowering said load platform relative to said frame assembly.

Preferably said chassis is positioned substantially parallel to a main axel of the vehicle.

Preferably said carriage assembly extends outwardly from said luggage compartment once said luggage compartment door is swung to an open position.

Preferably said load platform is swung down to a deployed position, such that said load platform is positioned directly underneath said access door.

Preferably said carriage assembly comprises first and second post members and inner and outer frames held between said members, the combination of inner and outer frames extending telescopically when said lifting device is in use.

Preferably said luggage compartment has a door.

Preferably said upright stowed position is substantially vertical.

Preferably said swinging motion is effected manually.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 3A illustrates in elevation view a carriage component of the lifting device;

FIG. 3B illustrates the carriage component in plan view;

FIG. 4A illustrates an outer frame member in elevation view;

FIG. 4B illustrates the outer frame member in plan view;

FIG. 4C illustrates the outer frame in end view;

FIG. 5A illustrates an inner frame member of the lifting device in elevation;

FIG. 5B illustrates the inner frame, and a load platform in end view;

DETAILED DESCRIPTION OF THE BEST MODE FOR CARRYING OUT THE INVENTION

Figure 1:
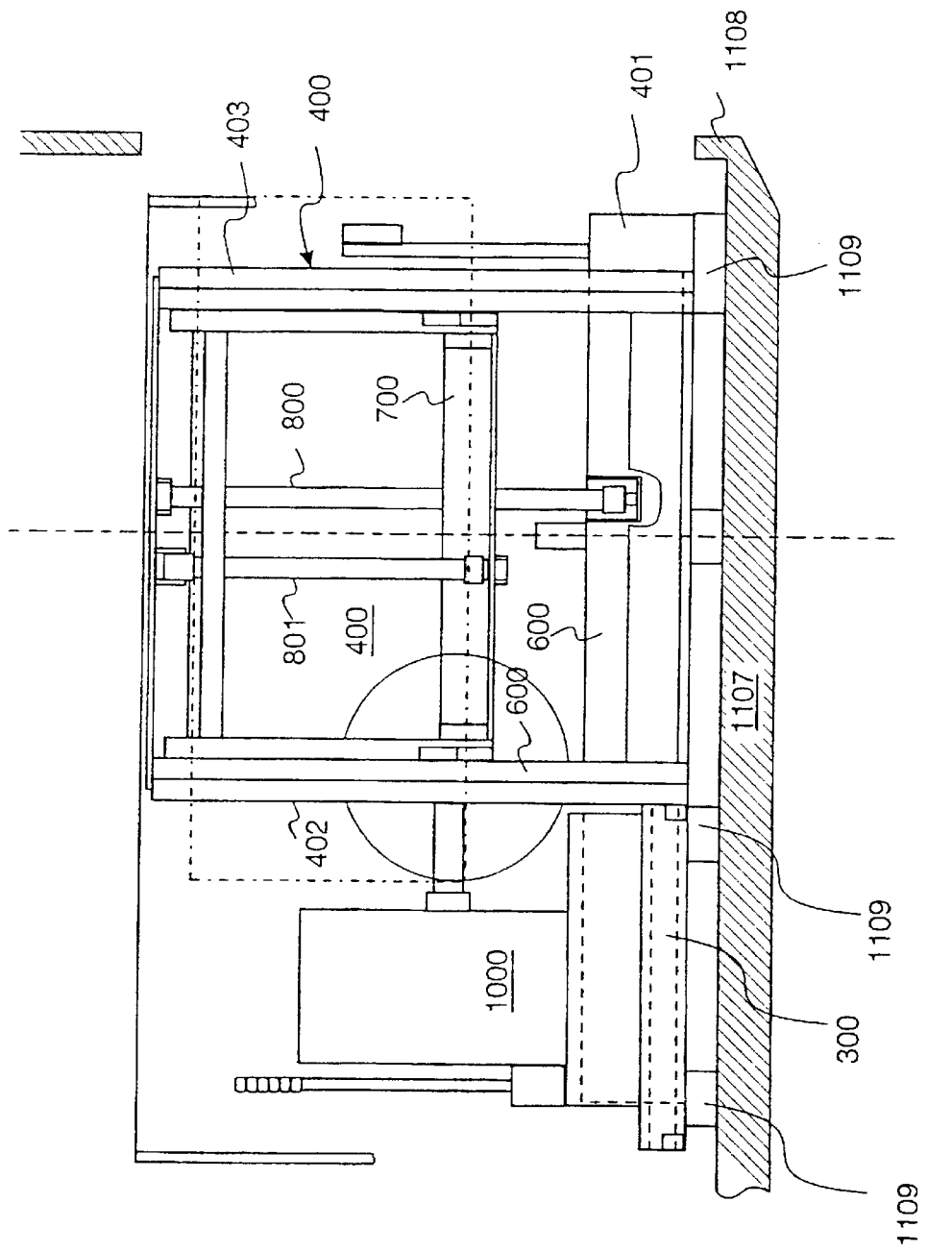
FIG. 1 herein illustrates in elevation view a lifting device according to a first specific embodiment of the present invention, when fitted inside a vehicle, underneath a load deck of the vehicle.
Figure 2A:
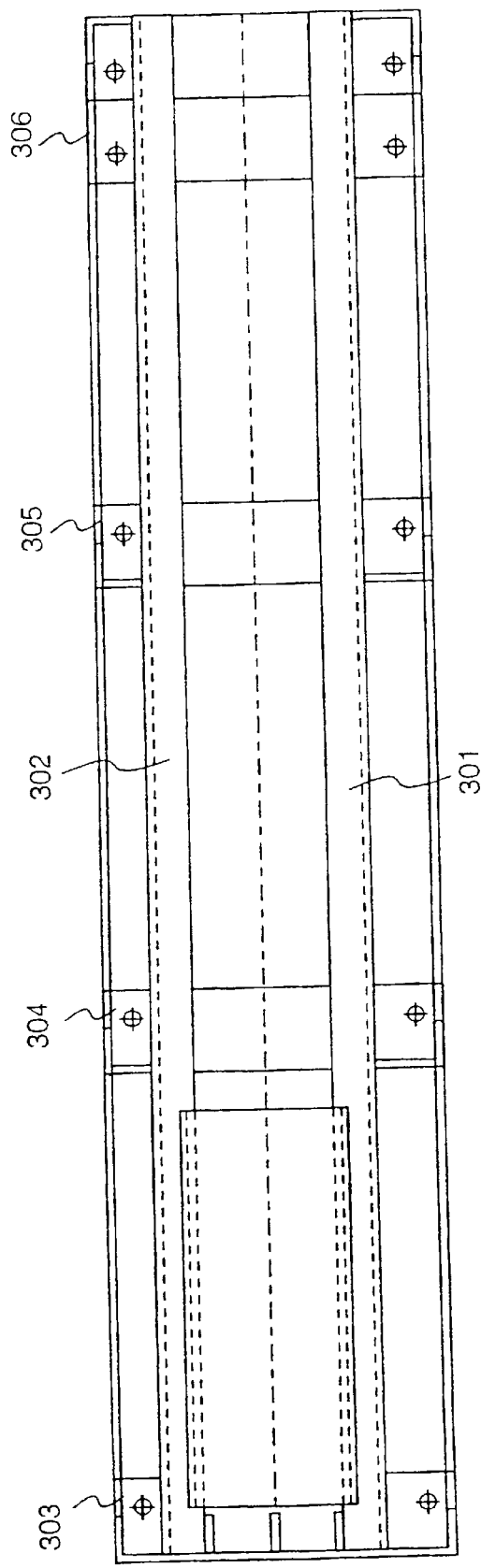
FIG. 2A illustrates in plan view a chassis member of the lifting device.
Figure 2B:
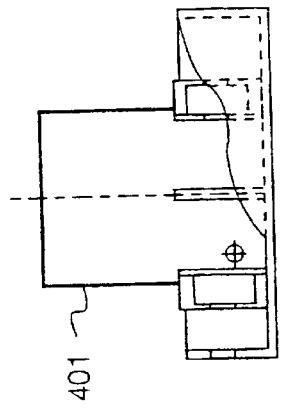
FIG. 2B illustrates in elevation view the chassis member.

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without using these specific details. In other instances, well known methods and structures have not been described in detail so as not to unnecessarily obscure the present invention.

Referring to FIGS. 1 to 6 herein, there is illustrated a lifting apparatus and various of its constituent components according to a first specific embodiment of the present invention. The lifting apparatus comprises a chassis tray 300 incorporating first and second spaced apart rails 301, 302 respectively, each rail comprising a substantially "C" shaped metal beam, the rails arranged facing opposite each other so as to enclose first and second ends of a first rectangle, said first and second rails rigidly mounted to a plurality of transverse base plates 303–306, such that said rails and said base plates in plan view approximate a ladder type arrangement; a carriage 400, said carriage comprising a tubular box section beam 401 arranged in parallel along a length of said frame and positioned between said first and second rails, and first and second spaced apart upright post members 402, 403 extending transversely to said beam and rigidly attached thereto, said first and second post members each having a substantially "C" shaped cross section, and facing opposite each other such as to describe first and second ends of a second rectangle in plan view, lower ends of said first and second posts rigidly secured to said beam, and upper ends of said first and second posts rigidly connected together by a cross member 404, the whole of said carriage being movable along a length of said chassis said carriage being guided by phosphor bronze bushes so as to retract onto and extend out of said chassis; a frame assembly, said frame assembly comprising an outer frame 600 operable to raise and lower relative to said carriage between said post members an inner frame 700 operable to raise and lower relative to said outer frame, said inner frame 700 contained within said outer frame 600, said inner frame comprising first and second inner upright members 701, 702 spaced apart from each other and rigidly connected to each other by upper and lower inner cross members 703, 704 respectively forming a rectangular frame section at the upper end of said inner frame, there being provided an elongate handrail 902 suitable for grasping by persons using the lifting device; said outer frame comprising substantially rectilinear shape including first and second upright members 601, 602 and lower and upper cross members 603, 604 respectively, said outer frame assembly positioned between said first and second post members and arranged to slide substantially vertically between a lower position in which a lower part of the outer frame is at a level of said beam member 401, and a raised position, in which said outer frame extends to a position above said beam member 401, said first and second uprights moving parallel to said first and second post members and engaging within an interior surface of said first and second post members, being slideably retained therebetween by a set of rollers or bearings; first and second hydraulic rams 800, 801, the first hydraulic ram 800 providing means for raising said outer frame with respect to said carriage, said first ram 800 having an upper end connected to said upper cross member 603 of the carriage, and a lower end connected to a seating position 405 provided in beam 401, the first ram 800 being a single acting ram operable to urge the upper cross member 603 of the outer frame away from the beam 401 thereby raising the outer frame with respect to the beam, the outer frame being lowerable by gravity and the weight of the outer frame itself and the weight of the inner frame carried by said outer frame, and said second ram 801 having an upper end connected to the cross member 603 of the carriage, and a lower end located on a lower cross beam 703 of said inner frame 700 the second hydraulic ram being a double acting ram capable of extending and retracting under hydraulic pressure to raise and lower said inner frame 700 with respect to said outer frame 600, said inner frame comprising a hinged load platform 900 connected to a lower portion of said inner frame, said hinged platform 900 capable of being swung between an upright position and a deployed position, as illustrated in FIG. 5B herein; and an hydraulic power supply means and control unit 1000 which receives electrical power from a 12 or 24 volt DC vehicle power supply, and which provides hydraulic power for powering controlled movement of the carriage and the inner and outer frames.

As shown in FIG. 5B herein, the load platform 900 is attached by hinges to said inner frame 700, such that a main plane of the load platform is moveable between an upright, substantially vertical position 901, in which position the platform may be stowed, and a substantially horizontal position used when operating the lifting device. The load platform is spring assisted for easy stowing.

The invention thus consists of a lifting device for lifting a load into and out of a vehicle comprising a load deck, the lifting device comprising: a platform operable to raise or lower between the load deck and a level beneath the load deck; means for raising and lowering the load platform; means for securing the load platform to the vehicle; wherein the load platform is arranged to stow beneath the load deck such that a main plane of the load platform is positioned transversely to a main plane of the load deck. In the preferred embodiment, the load platform is stowed in an upright position. Furthermore, in a stowed position, it is preferred that a main plane of the load platform is transverse to a main length of the vehicle.

Operation of the lifting device will now be described with reference to FIGS. 1 to 13 herein. Specific embodiments according to the present invention are adaptable to many different types of road or rail coach or bus vehicles of different designs within the total vertical travel limit of 1.7 m. The following operation is described with reference to a specific installation in a "hi-line" type coach road vehicle.

Figure 6:
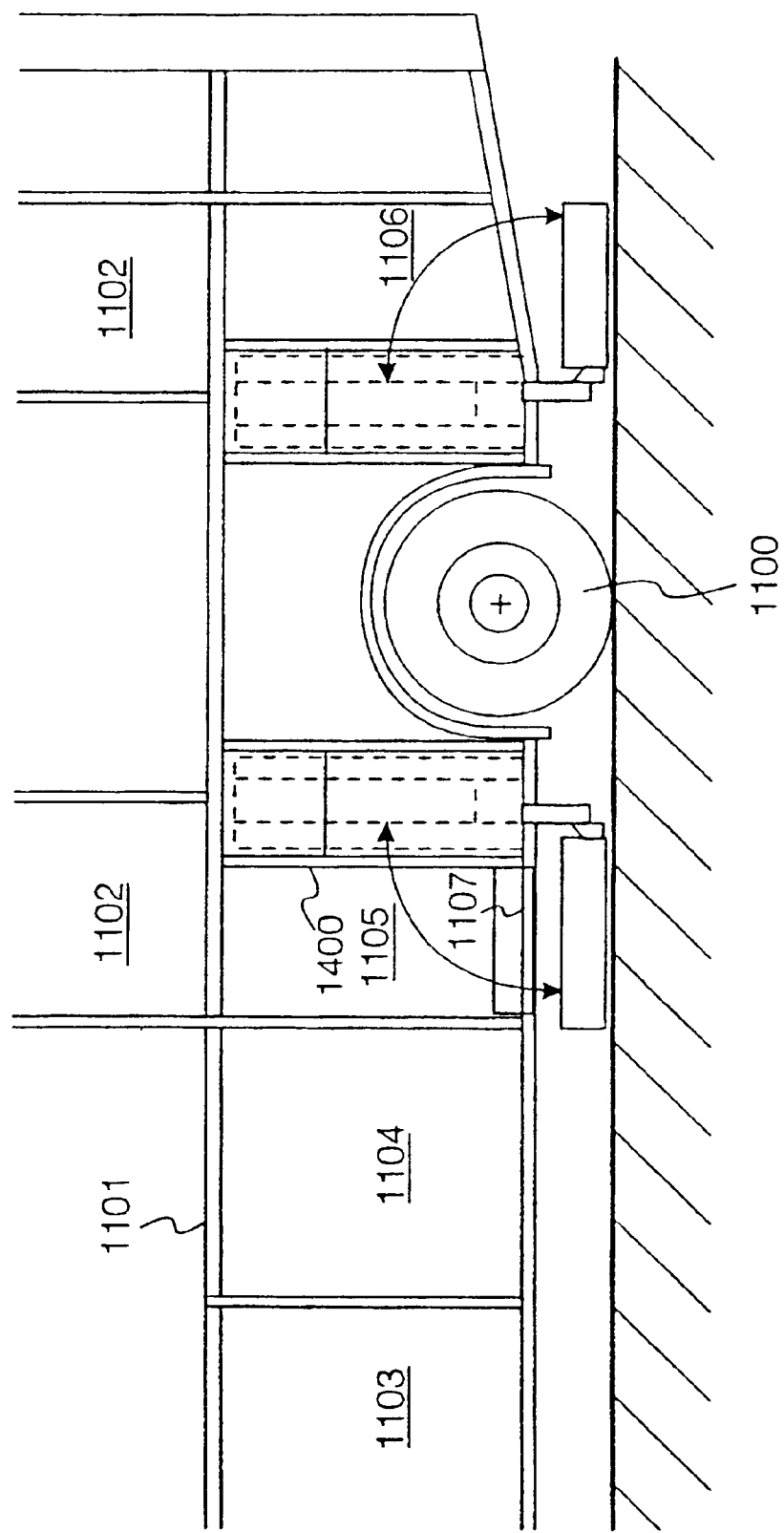
FIG. 6 illustrates in side view alternative left handed and right handed versions of the lifting device installed in a "hi-line" coach vehicle.

Referring to FIG. 6 herein, there is shown in side elevation a rear end of a vehicle of the "hi-line" coach or bus type, the vehicle having a rear axle and rear wheel set 1100, a load deck 1101 comprising a plurality of passenger seats and forming a passenger deck of the vehicle, and a passenger deck access door 1102 at a height above the level of the load deck 1101, for entering or exiting the vehicle. In FIG. 6, there are shown alternative positions of passenger deck access door 1102, in alternative left handed and right handed embodiments of a lifting device according to the present invention. Hereinafter, there is described operation of a left handed version of the lifting device, but it will be understood by persons skilled in the art that operation of a right handed lifting device is a substantially mirror image of operation of the left handed embodiment, and adaptations to its construction are made accordingly.

Figure 7:
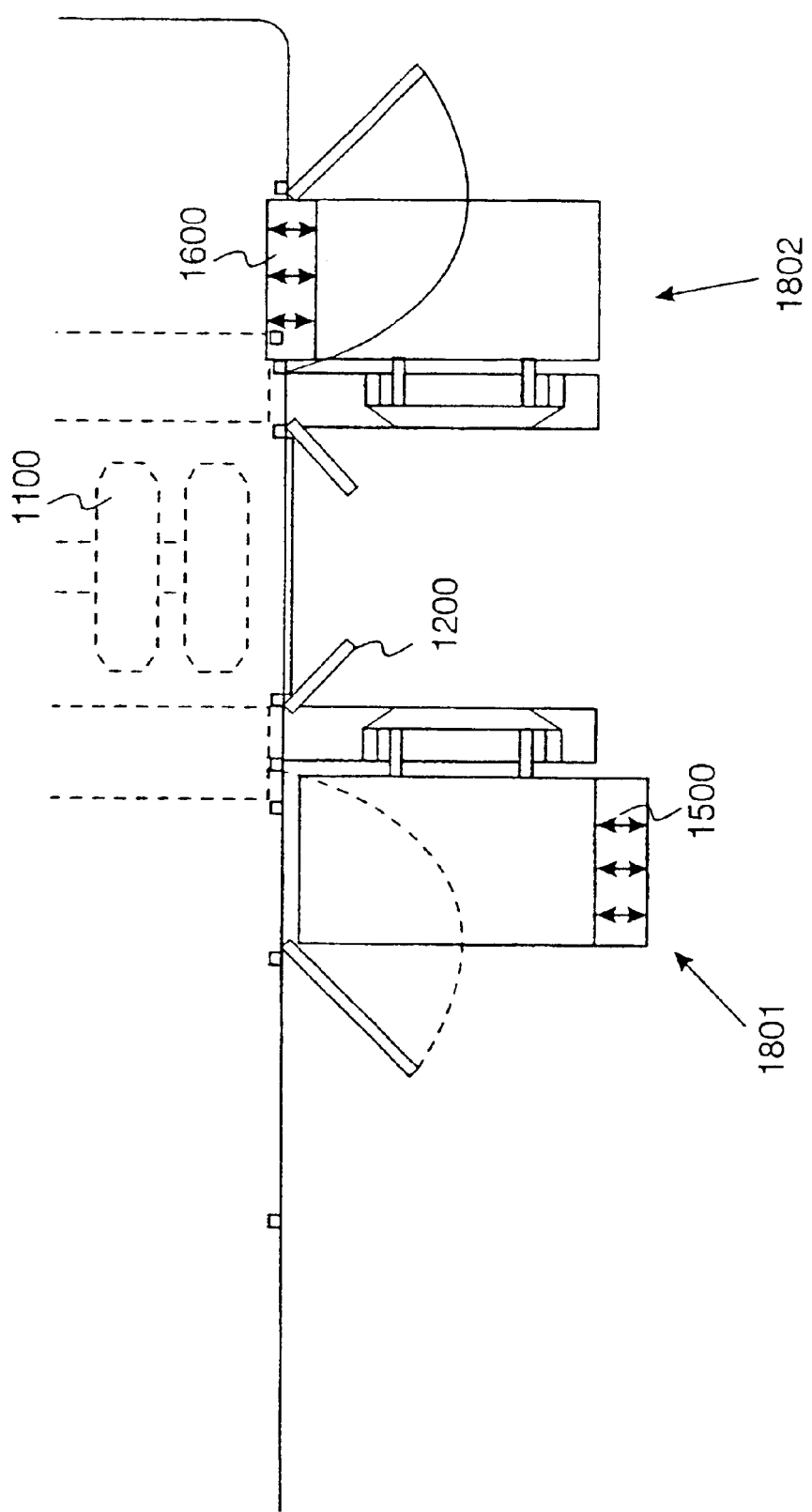
FIG. 7 illustrates in plan view operation of the left handed and right handed embodiments, installed in the "hi-line" coach vehicle.

Underneath the load platform (cabin floor) 1101 of the vehicle, are provided a plurality of luggage compartments 1103 to 1106. The lifting device is fitted into a luggage compartment 1105 substantially underneath the cabin access door 1102 as shown in FIG. 6. The lifting device is fitted into the luggage compartment by securing the base tray of the chassis directly to a floor 1107 of the luggage compartment. As shown in FIG. 1 adjustment of the height of the lifting device to clear a lip 1108 of the floor of the vehicle luggage bay may be made by packing blocks of wood 1109 between the base plates of the chassis and the floor, the blocks being cut to size depending on the type of vehicle. A main length of the chassis 300 is positioned substantially parallel to a main axle of the vehicle, across a width of the vehicle luggage bay such that in use, the carriage assembly extends outwardly from the luggage compartment as shown in FIG. 7, once a luggage compartment door 1200 is swung to an open position. The load platform 900 is swung down to a deployed position, such that the load platform is positioned directly underneath the access door 1102.

A raising and lowering operation of the lifting device for lifting a passenger into and out of a passenger cabin of the vehicle will now be described. In FIG. 7 at 1801 a left handed version of the device is generally illustrated wherein the load platform is deployed at ground level and at 1802 a right handed version is generally illustrated wherein the load platform is deployed at cabin level.

To deploy the lifting device, the carriage 400 is powered along the chassis 300 by a double acting hydraulic ram or linear actuator, such that the beam 401 extends outside of the vehicle body. The load platform is manually swung down from its upright stowed position, in which a main plane of the platform is substantially vertical, to an operating position in which the main plane of the platform is substantially horizontal, as shown in FIGS. 5*b*, 6, 7, 8 and 9 herein. By operation of a hydraulic control, the platform is lowered, using the second hydraulic ram 801 which urges the inner frame in a downward direction with respect to the outer frame, both inner and outer frames held between first and second post members of the carriage. In the best mode herein, the load platform extends to a maximum distance 42 cms. from its datum position in which a lower extremity of the outer frame is at a same level as a lower extremity of the carriage beam 401. A passenger may be moved onto the load platform, at ground level or at pavement level. By operating the hydraulic control means, the second hydraulic ram 801 is actuated which urges the inner 601 and 602 frame upwardly with respect to the main carriage beam 401, and consequently carrying the load platform 900 until the load platform reaches a level of the load deck of the vehicle. The passenger may be moved from the load platform onto the load deck of the vehicle, which are now at the same level. When the load platform is at the same level as the load deck of the vehicle, the inner frame extends upwardly of the outer frame, the combination of inner and outer frame extending telescopically under control of first and second ram 800, 801. The passengers may grasp the handrail 902 during raising and lowering of the platform, the handrail being secured at an upper end of the inner frame and extending transversely to a main length of the vehicle in use. An additional handrail is provided which folds down into the platform tray before it is stored vertically. This hinged handrail engages itself with a spring clip onto the side of the platform on the opposite side to the main lifting frame. Hydraulic power is supplied to first and second rams 800, 801 by control and power unit 1000 which operates off a 12 or 24 volt DC power supply of the vehicle. The control unit supplies hydraulic power to the hydraulic rams 800, 801 and also controls the hydraulic rams, receiving electrical inputs from a set of electro mechanical sensors which detect the position of the inner and outer frames with respect to the beam 401 and upright post members 602, 603 and which may also detect the position of the carriage assembly relative to the main chassis. The control unit may comprise a conventional micro processor unit, or conventional hard wired electronics for receiving signals from a hand control unit operable by a coach driver or other person.

Figure 9:
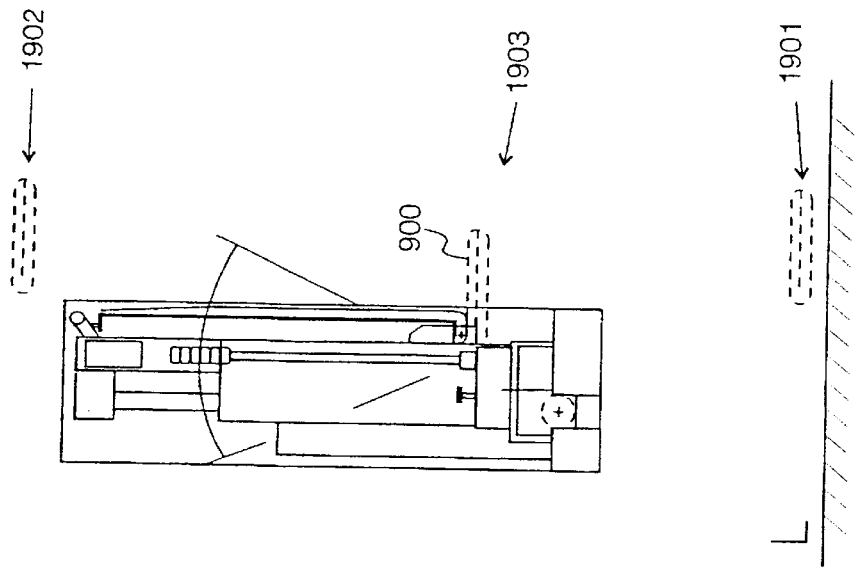
FIG. 9 illustrates in end view the lifting device in a stowed position.
Figure 8:
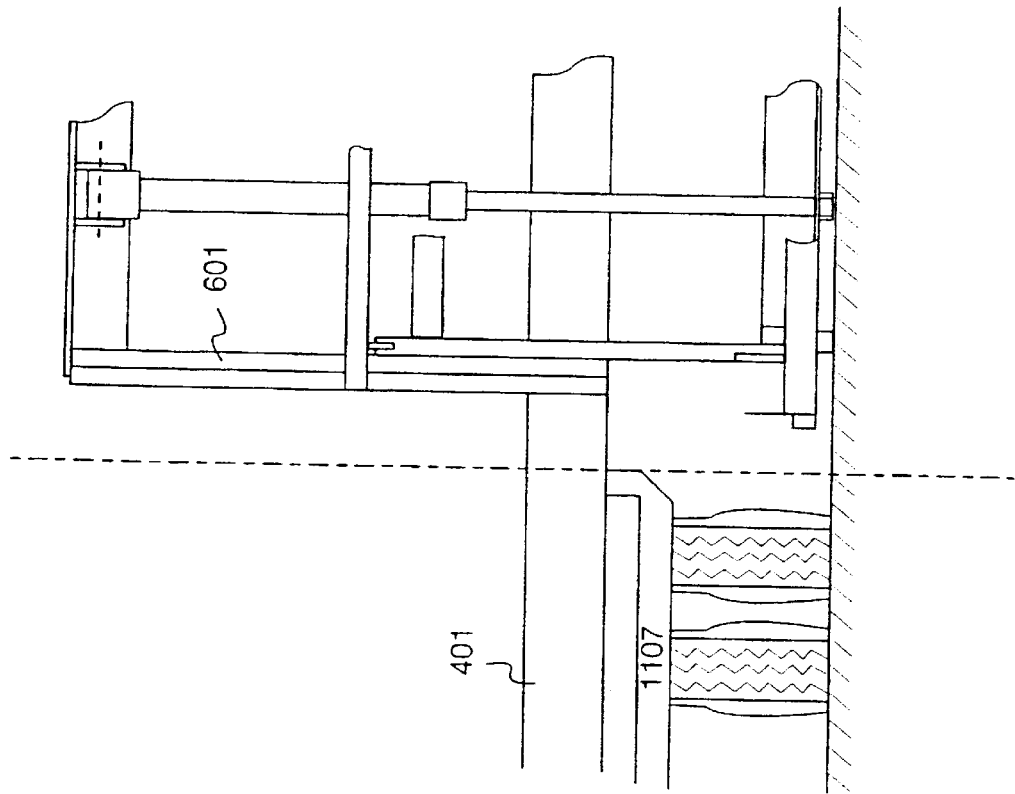
FIG. 8 illustrates in elevation the lifting device in a deployed position, in which a load platform of the lifting device is lowered to ground level.

FIG. 9 generally illustrates the possible positions of the load platform 900. Platform 900 may be lowered to ground or pavement level as indicated at 1901 or may be raised to the cabin level of a "hi-line" coach or bus as indicated at 1902. The position of the load platform indicated at 1903 represents the position of the load platform at a point between positions 1901 and 1902 when ready for vertical stowage.

Stowage of the lifting device in the vehicle, for transport with the vehicle will now be described.

To stow the lifting device prior to moving the vehicle, the load platform is manually swung from the horizontal position to an upright position, in which a main plane of the load platform remains substantially upright and substantially parallel to the first and second uprights and inner and outer frames. A retaining member 1300 at an upper end of the inner frame cooperates with an engagement lug on a periphery of the load platform, to retain the load platform in upright position. The inner and outer frames are moved to a stowage position, in which they are retained at a level coincident with the first and second uprights 602, 603, and are retained within a quadrilateral described by the first and second uprights. Positioning of the inner and outer frames may be made automatically by the control electronics of the control unit and power pack in response to a push button signal of the coach driver or operator. The carriage, with the load platform in the upright stowed position is then retracted by powering along the chassis, to a fully stowed position in which the carriage is positioned within a length of the chassis. There is provided locking means for locking the carriage to the chassis, to avoid the carriage sliding along the chassis in response to movements of the vehicle, and as a safety feature to avoid the beam extending outwardly from the side of the vehicle when the vehicle is in motion. The same provision locks the carriage when in its working position.

Figure 10:
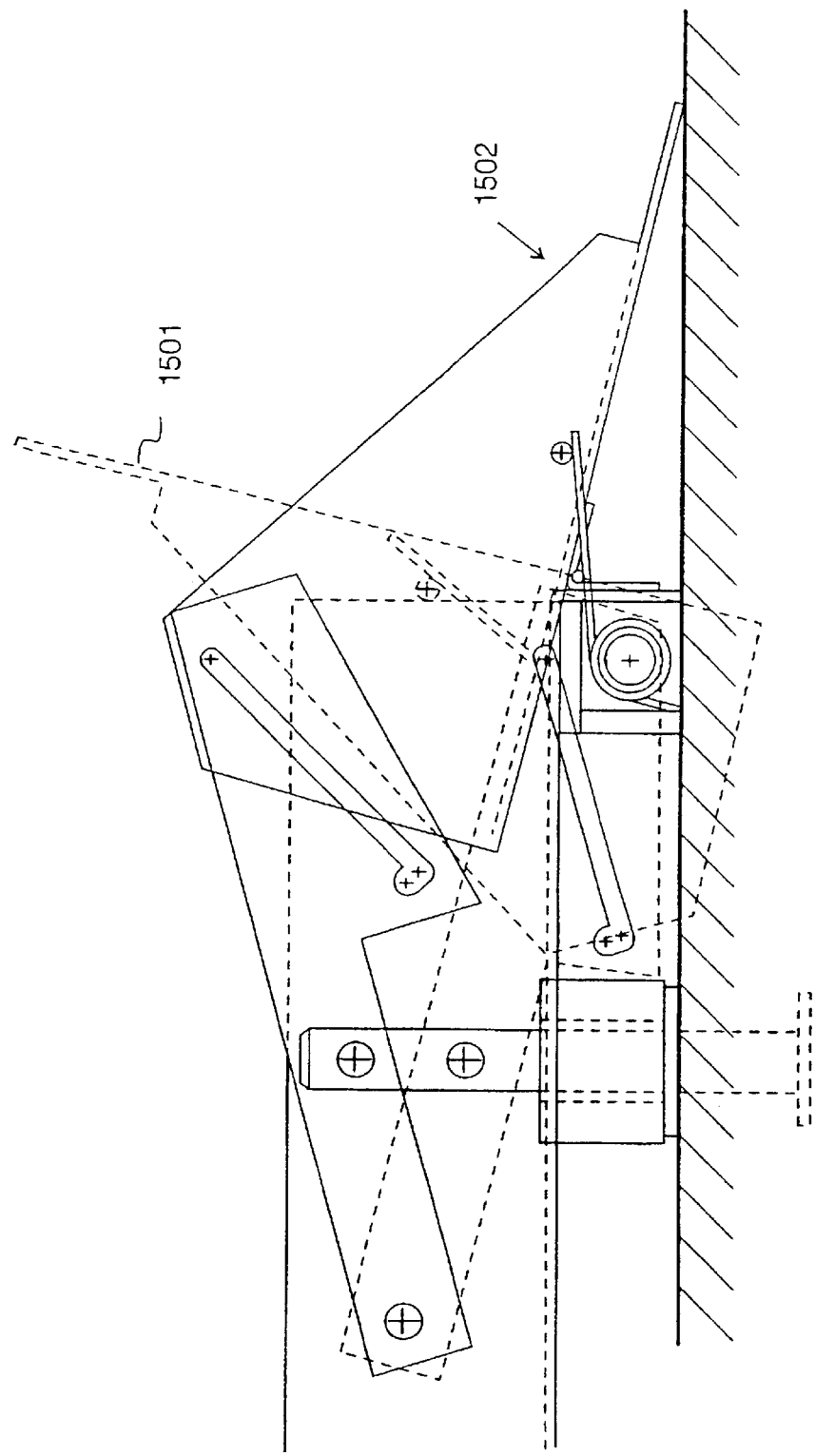
FIG. 10 illustrates a ground level roll stop assembly at a first end of the load platform.
Figure 11:
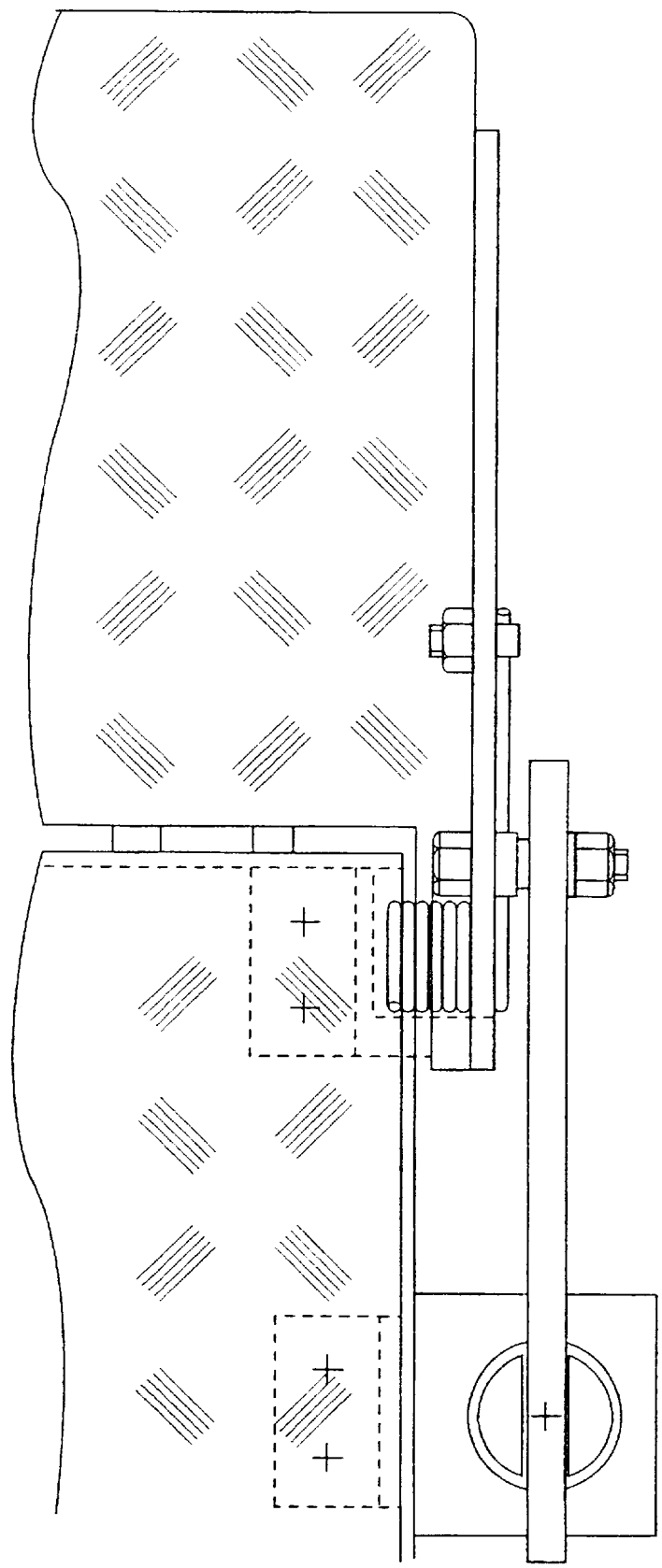
FIG. 11 illustrates in plan view detail of a portion of the ground level roll stop assembly.

As shown in plan view in FIG. 7, the platform comprises at a first side, a ground level roll stop assembly 1500, as shown in greater detail in elevation in FIG. 10, which can be folded between a stowed position 1501 and an extended deployed position 1502, for providing a smooth transition between ground level and the platform when in lowered position at ground level, such that wheelchairs, sack wheels, or other load devices can easily be rolled onto the platform. The double headed arrows shown on the ground level roll stop assembly for illustrative purposes are intended to indicate movement of for example a wheelchair onto the platform and off of the platform. In FIG. 11 herein, there is shown detail of a spring arrangement for retaining the roll stop assembly in the stored position 1501, and for locking the roll stop assembly in the deployed position 1502.

Figure 12:
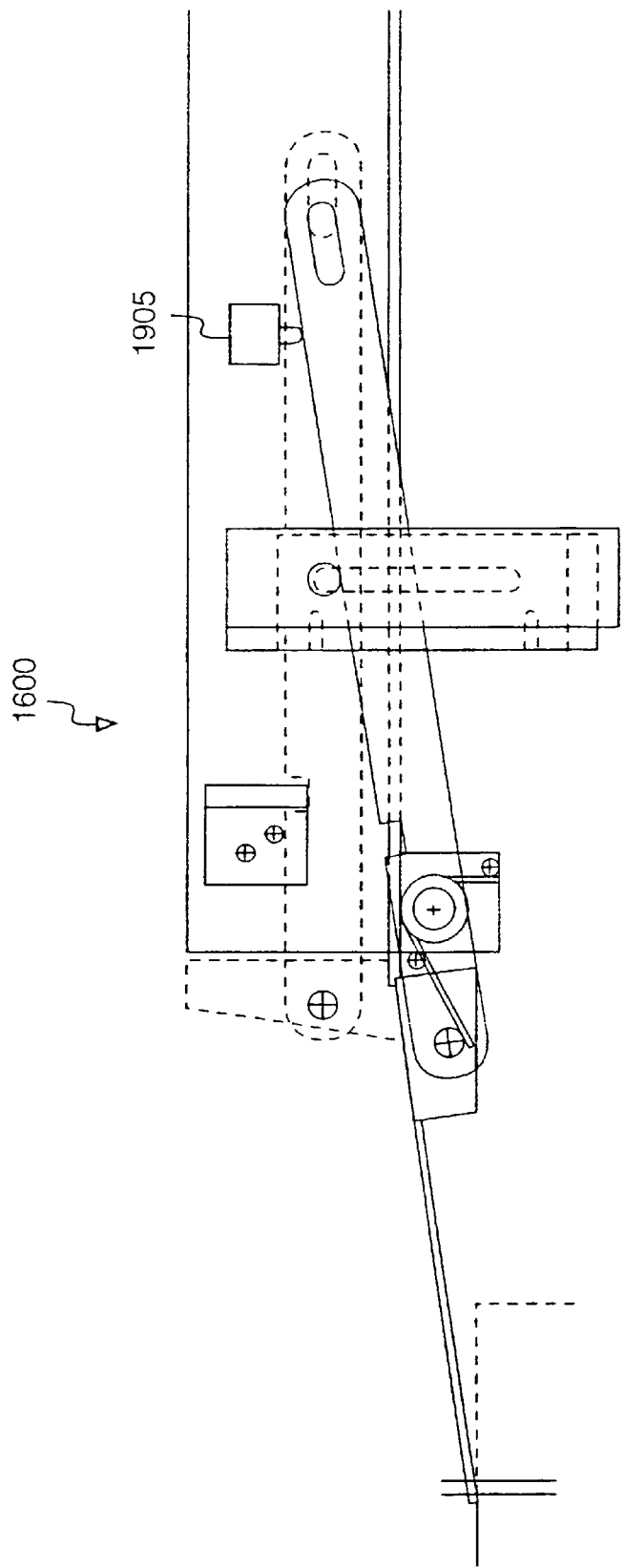
FIG. 12 illustrates in elevation view a bridge plate assembly at a second end of the load platform.
Figure 13:
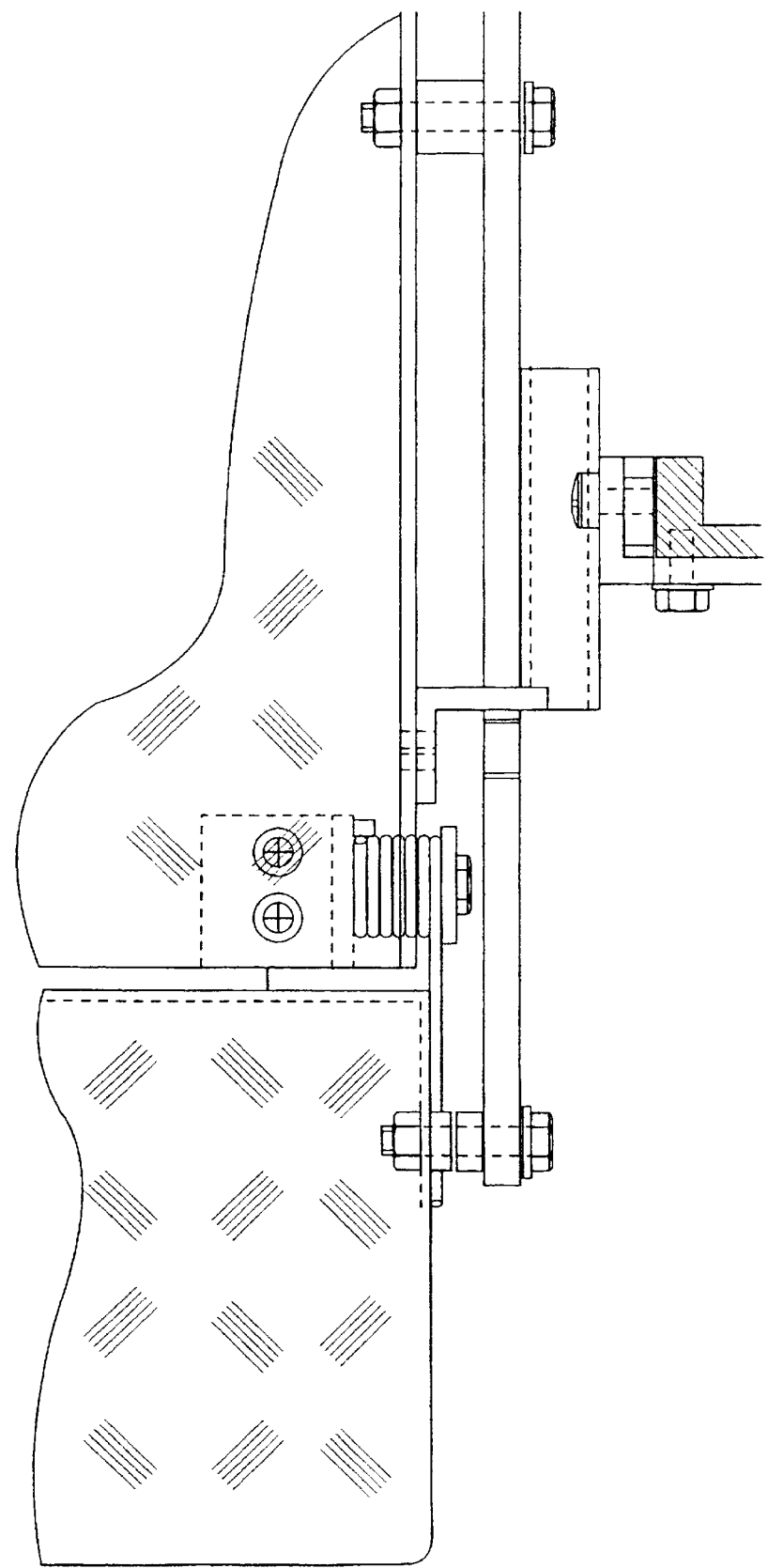
FIG. 13 illustrates in plan view a portion of the bridge plate assembly.

At an opposite end of the load platform 900, is provided a bridge plate 1600, as shown in greater detail in FIGS. 12 and 13 herein. As for the roll stop assembly described above the double headed arrows indicate movement of a wheelchair onto and off of the platform. The bridge plate provides a smooth transition from the load platform and an upper surface of the load deck or passenger deck of the vehicle, and bridges a small gap between the vehicle load deck and the surface of the load platform, when the load platform is in the upper position adjacent the passenger access door. The bridge plate is foldable into a stored position in which the ramp clears the side of the vehicle body, when raising and lowering the platform, and is locked in that position. When in the stored position the bridge plate is held in place by a mechanical lock.

As can be seen from FIG. 7 herein, the load platform, carriage and chassis extends transversely across a width of the bus, and occupies a relatively small length of the vehicle, of the order 430 mm along the vehicle length. Since the load platform and inner and outer frames are upright within the luggage compartment, there is left space for placing luggage at the side of the lifting device when the lifting device is in the stowed position. Thus, fitment of the lifting device in a luggage compartment of the vehicle does not involve losing use of the whole of the luggage compartment for storage of luggage. The lift is provided with an aluminum cassette which covers the top, both sides and one end with access panel to the control unit and emergency hand pump.

Further, as the lifting device rests upon a floor of the luggage compartment, fitment of the lifting device to the luggage compartment involves securing the chassis to the floor of the luggage compartment by direct securement, e.g. bolts. Installation of the lifting device is therefore simple and quick, involving placement of the lifting device within a luggage compartment of the vehicle, drilling of necessary holes for attachment of the chassis to the luggage compartment floor, and connection of electrical connections to the control box. Installation times for installment of the present embodiment lifting device are relatively short, of the order of 2 to 4 hours. This compares with installation times for prior art lifting devices in which the load platform is stored horizontally within a luggage bay, of the order of 1 to 2 days.

Figure 14:
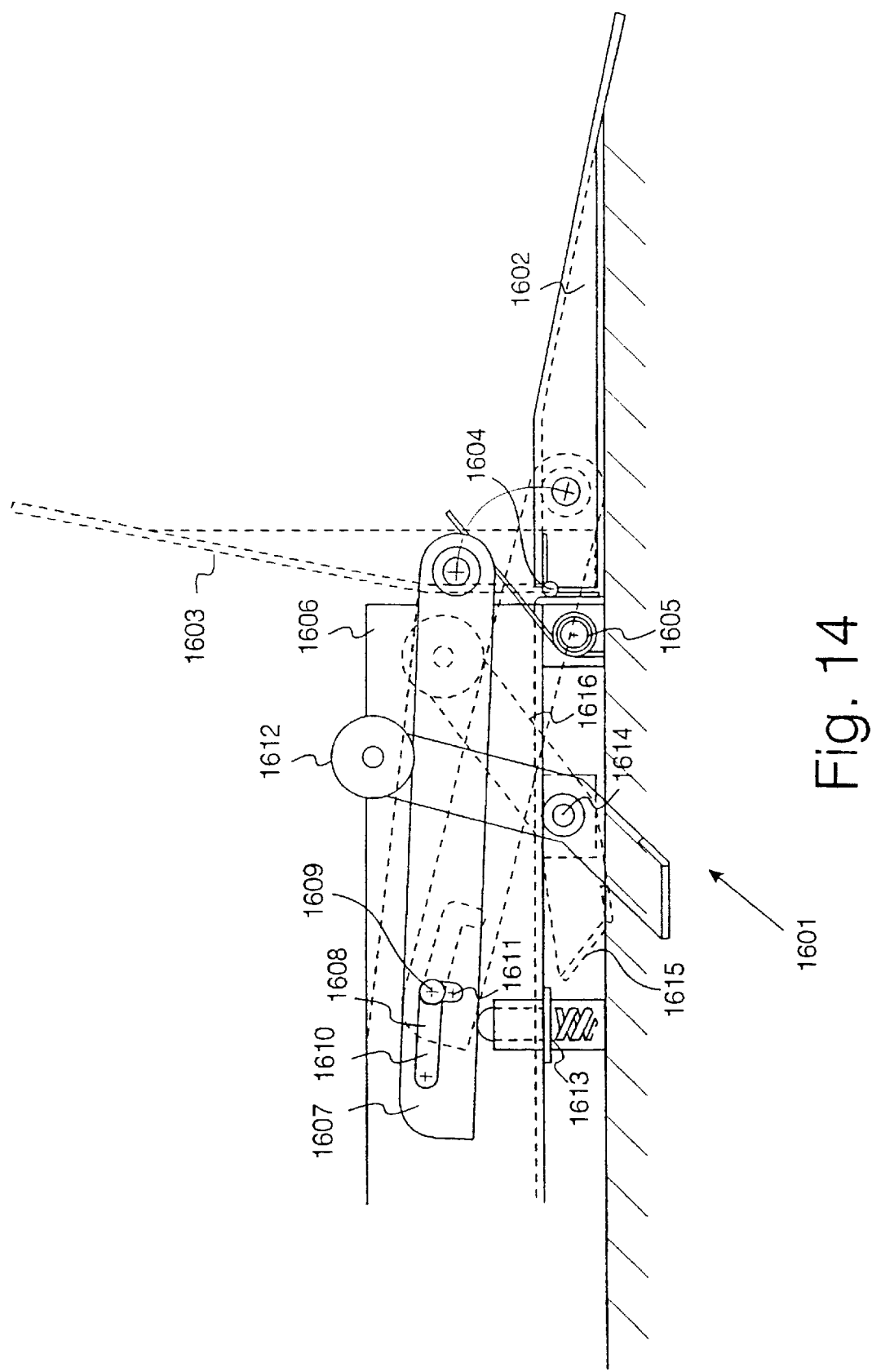
FIG. 14 illustrates a further embodiment of a ground level roll stop assembly.

A further embodiment of a ground level roll stop assembly 1601 is detailed in elevation view in FIG. 14. The assembly comprises roll stop ramp 1602 which may be deployed to a functional position as illustrated or returned to a vertical stored position as indicated substantially by the region 1603 (Region 1603 being bound by broken lines to schematically illustrate the stored position). Movement between the stored position 1602 and stored position 1603 is effected via a hinge arrangement 1604 and spring 1605 configured to substantially lock structure 1602 either in its deployed position or its stored position. Hinge arrangement 1604 and spring 1605 are connected to a side section 1606, a side section also being located on the opposite side of the ground level roll stop assembly. Platform 1602 also communicates with moveable structure 1607. Moveable structure 1607 is held to side section 1606 via slot 1608 communicating with pin 1609 located on side panel 1606. The slot 1608 is moveable about pin 1609 such that moveable structure 1607 may be moved from left to right and vice versa in the diagram. Slot 1608 comprises a right angle giving rise to a substantially horizontal slot portion 1610 and a substantially vertical slot portion 1611. Structure 1607 may be effectively moved to the right guided by slot 1608 and also guided by moveable structure 1612. Following the deployment of plate 1602 member 1607 is additionally locked in place by a spring loaded lock cartridge 1613. Guide member 1612 is rotatable about pivot 1614 such that during the deployment of plate 1602 member 1612 effectively forces structure 1607 into a position suitable for deployment of plate 1602. The position of structure 1612 following deployment of plate 1602 is shown by broken lines at 1615 and 1616 for example.

Figure 15:
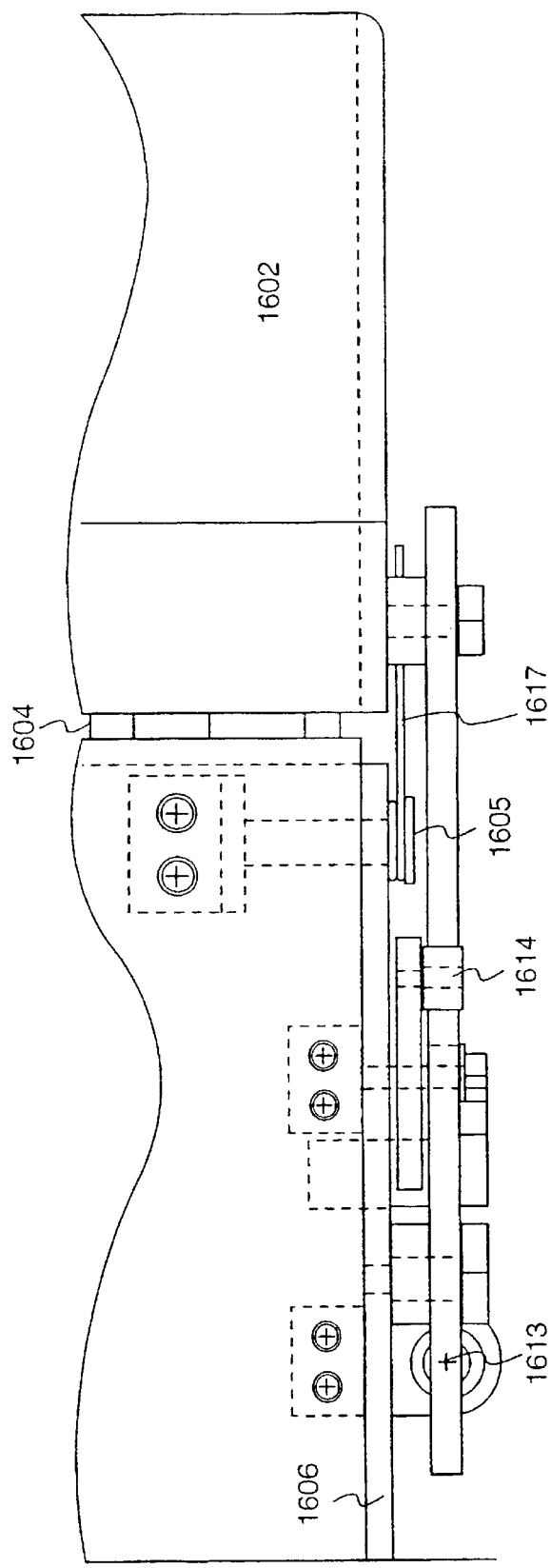
FIG. 15 illustrates in plan view, a portion of the ground level roll stop assembly identified in FIG. 14.

A plan view of the ground level roll stop assembly identified in FIG. 14 is detailed in FIG. 15 which illustrates plate 1602 attached to side panel 1606 via a hinged arrangement 1604 and a spring structure 1605. Spring 1605 comprises a member 1617 which communicates with plate 1602. Spring arrangement member 1617 is effectively configured to retain the roll stop assembly in a stored position and also may be configured to effect locking of the roll stop assembly in the deployed position.

Figure 16:
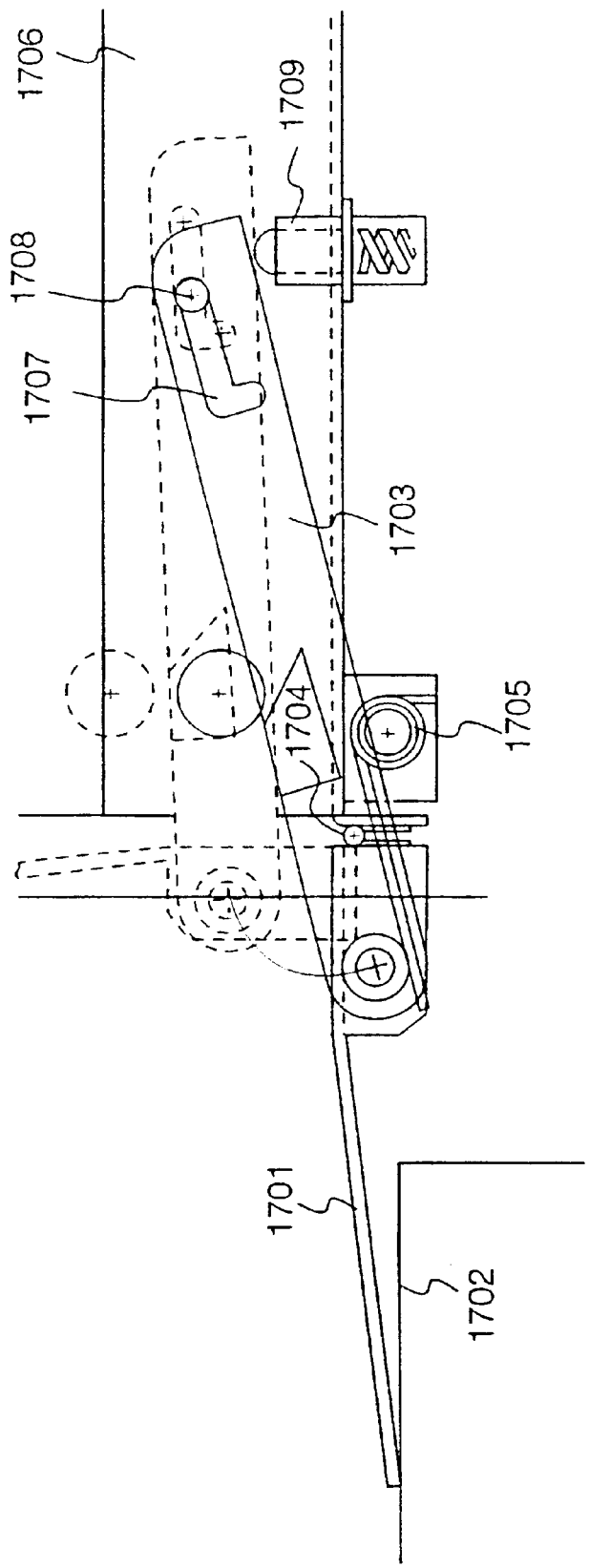
FIG. 16 illustrates, in plan view an alternative embodiment of a bridge plate assembly at an end of the load platform.
Figure 17:
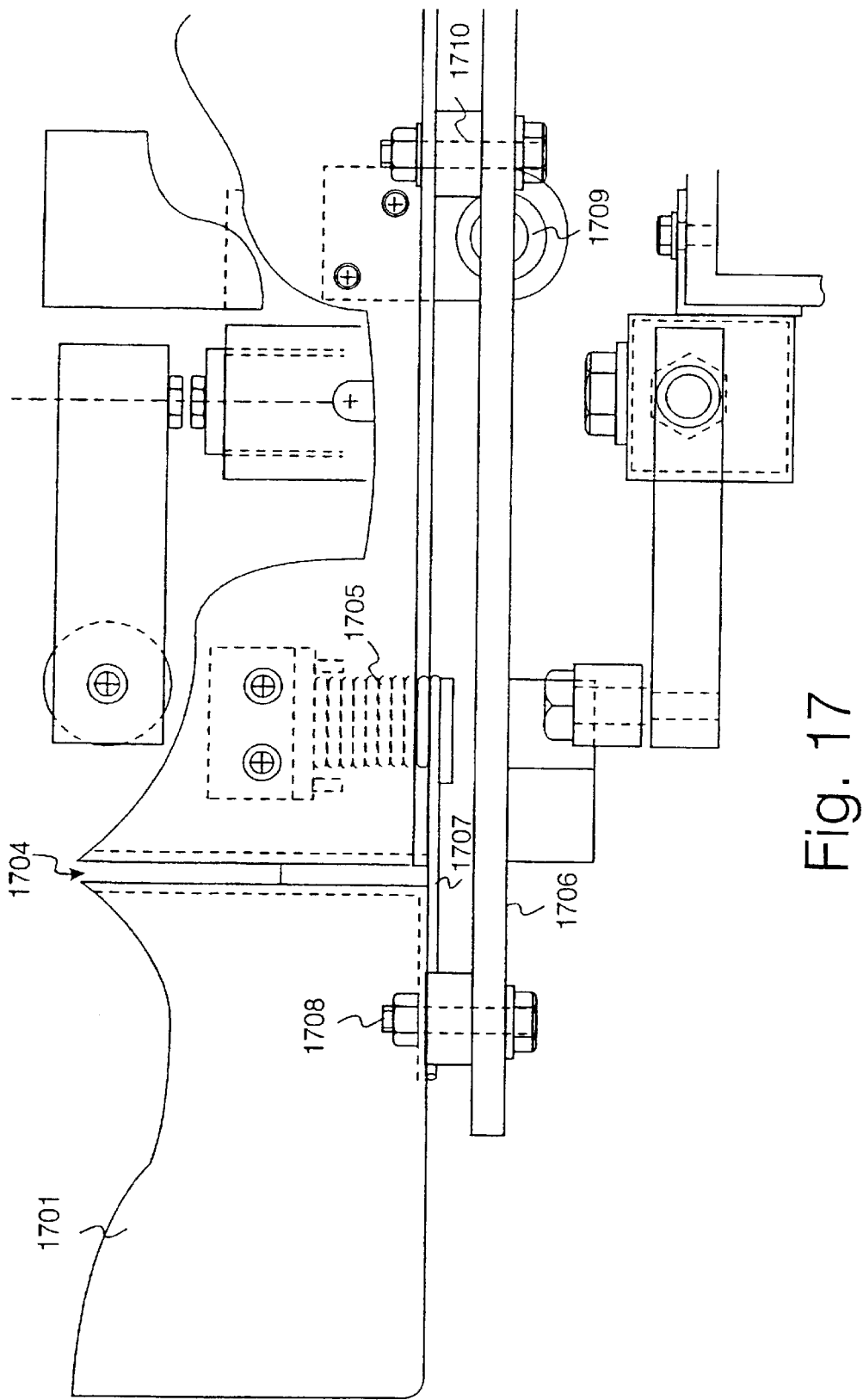
FIG. 17 illustrates in plan view a portion of the bridge plate assembly identified in FIG. 16.

As described earlier, at an opposite end of the load platform 900, is provided a bridge plate 1600. A further embodiment of the bridge plate is illustrated in FIGS. 16 and 17. The bridge plate assembly comprises bridge plate 1701 which in its deployed position is configured to communicate with the floor of a given vehicle 1702. The mechanism provided for storage and deployment of the bridge plate assembly detailed in FIGS. 16 and 17 is substantially similar to that described for the roll stop assembly as identified in FIGS. 14 and 15. The bridge plate 1701 may be deployed as shown, or alternatively may be retracted to a storage position wherein the plate is positioned substantially parallel to member 1703. The retraction is effected by hinge arrangement 1704 and spring arrangement 1705. Hinge arrangement 1704 and spring arrangement 1705 communicate with member 1703. Member 1703 is moveable in a manner substantially similar to that described for member 1603 identified in FIG. 14. Member 1703 also communicates with side panel 1706 via slot arrangement 1707 which comprises a substantially vertical portion and substantially horizontal portion. Slot arrangement 1707 communicates with pin 1708 forming part of the paneled wall 1706. Thus structure 1703 is moveable substantially from the left to the right and vice versa and is substantially held in place by communicating slot 1707 and pin 1708 which enable structure 1703 to also move in a generally downwards direction during deployment or in a generally upwards direction during retraction. Locking spring loaded lock cartridge 1709 is attached to roll stop wall 1706 and the floor of the roll stop assembly, the locking cartridge being configured to communicate (i.e. abut against) member 1703 to effect a locking action. In the locked position pin 1708 is substantially positioned to the far right hand of slot 1707 and lock cartridge 1709 is effectively sprung into place to effect its locking action upon member 1703.

A plan view of the bridge plate assembly detailed in FIG. 16 is provided in FIG. 17. The bridge plate 1701 is shown in the deployed position attached to side panel 1706 by hinge arrangement 1704 and spring arrangement 1705. Spring arrangement 1705 comprises elongate member 1707 which communicates with bolt arrangement 1708 so as to effect deployment or retraction of plate 1701. Bolt arrangement 1708 provides communicating means for plate 1701 to attach to plate 1706. The roll stop assembly is also connected to side panel 1706 via bolt arrangement 1710.

What is claimed is:

1. A lifting device for attachment to a luggage compartment located substantially below a cabin access door to a passenger load deck of a hi-line vehicle, wherein said lifting device comprises:

an elongate chassis incorporating first and second spaced apart rails, said rails arranged facing opposite each other so as to enclose first and second ends of a first rectangle; and a carriage arranged in parallel along a length of said chassis and positioned between said first and said second rails, the whole of said carriage being movable along a length of said chassis rails and said carriage being extendible out of and retractable onto said chassis; and a frame assembly comprising an outer frame operable to raise and lower relative to said carriage and an inner frame operable to raise and lower relative to said outer frame, said frame assembly being configured such that during operation said frame assembly operates to raise and lower a load platform above and below a level of said carriage; and in a stowed position a main plane of said load platform remains substantially upright and parallel to said inner and outer frames, said load platform being aligned with the direction of movement of said carriage along said chassis;

and wherein said carriage comprises a beam; and wherein said outer frame comprises a substantially rectilinear shape including first and second upright members and lower and upper cross members respectively, the outer frame assembly being positioned between first and second post members and arranged to slide substantially vertically between a lower position in which a lower part of said outer frame is at a level of said beam member, and a raised position, in which said outer frame extends to a position above said beam member, said first and second uprights moving parallel to said first and second post members, engaging with an interior surface of said first and second post members and being slidably retained therebetween.

2. A lifting device for attachment to a luggage compartment located substantially below a cabin access door to a passenger deck of a hi-line vehicle, said lifting device comprising:

an elongate chassis tray incorporating first and second spaced apart rails, each rail comprising a substantially "C" shaped beam, the rails arranged facing opposite each other so as to enclose first and second ends of a first rectangle, said first and second rails being rigidly mounted to a plurality of transverse base plates;

a carriage comprising a tubular box section beam arranged in parallel along a length of said chassis and positioned between said first and second rails, and first and second spaced apart upright post members, extending transversely to said beam and rigidly attached thereto, said first and second post members having a substantially "C" shaped cross section, and facing opposite each other such as to describe first and second ends of a second rectangle in plan view, the lower ends of said first and second post members being rigidly secured to said beam, and upper ends of said first and second post members being rigidly connected together by a cross member, the whole of said carriage being movable along a length of said chassis rails and said chassis being guided by guides configured to retract said carriage onto and extend said carriage out of said chassis;

a frame assembly comprising an outer frame operable to raise and lower relative to said carriage between said post members and an inner frame operable to raise and lower relative to said outer frame, said inner frame being contained within said outer frame and said inner frame comprising first and second inner upright members spaced apart from each other and rigidly connected to each other by upper and lower inner cross members forming a rectangular frame section at the upper end of said inner frame, there being provided an elongate handrail suitable for grasping by persons using the lifting device; and said outer frame comprising a substantially rectilinear shape including first and second upright members and lower and upper cross members, said outer frame assembly being positioned between first and second post members and arranged to slide substantially vertically between a lower position in which a lower part of the outer frame is at a level of said beam member, and a raised position, in which said outer frame extends to a position above said beam member, said first and second uprights being configured to move parallel to said first and second post members and engaging with an interior surface of said first and second post members, being slideably retained therebetween by a set of rolling members;

first and second hydraulic rams, the first hydraulic ram being configured for raising said outer frame with respect to said carriage, said first ram having an upper end connected to said upper cross member of the carriage, and a lower end connected to a seating position provided in said beam, the first ram being a single acting ram operable to urge the upper cross member of the outer frame away from said beam thereby raising the outer frame with respect to said beam, the outer frame being lowerable by gravity and the weight of the outer frame itself and the weight of the inner frame being carried by said outer frame, and said second ram having an upper end connected to the cross member of the carriage, and a lower end located on a lower cross beam of said inner frame, the second hydraulic ram being a double acting ram capable of extending and retracting under hydraulic pressure to raise and lower said inner frame with respect to said outer frame, said inner frame comprising a hinged load platform connected to a lower portion of said inner frame, said hinged load platform being capable of being swung between an upright stowed position and a deployed position such that in the deployed position said frame assembly is configured to raise and lower said load platform above and below a level of said carriage and in said stowed position a main plane of said load platform is positioned substantially parallel to said inner and outer frames; and a hydraulic power supply means and control unit configurable for receiving electrical power from a vehicle power supply and thereby providing hydraulic power for powering controlled movement of said carriage and said inner and said outer frames.

* * * * *